United States Patent [19]

Quantrille et al.

[11] Patent Number: 5,334,446
[45] Date of Patent: Aug. 2, 1994

[54] COMPOSITE ELASTIC NONWOVEN FABRIC

[75] Inventors: Thomas E. Quantrille, Simpsonville; Jared A. Austin, Greer; G. Stanley Zimmerman, Greenville, all of S.C.

[73] Assignee: Fiberweb North America, Inc., Simpsonville, S.C.

[21] Appl. No.: 825,016

[22] Filed: Jan. 24, 1992

[51] Int. Cl.$^5$ .................. B32B 5/16; B32B 27/34; D06N 7/04
[52] U.S. Cl. .......................... 428/284; 428/109; 428/152; 428/198; 428/283; 428/287; 428/296; 428/299; 428/326; 428/903
[58] Field of Search .......... 428/198, 284, 283, 287, 428/152, 296, 326, 903, 109, 299

[56] References Cited

U.S. PATENT DOCUMENTS

| | | | |
|---|---|---|---|
| 2,982,680 | 5/1961 | Ellis et al. | 428/152 |
| 3,519,530 | 7/1970 | Struble, Jr. | 428/152 |
| 3,597,299 | 8/1971 | Thomas et al. | 428/152 |
| 3,600,262 | 8/1971 | Frank | 161/79 |
| 3,765,997 | 10/1973 | Dunning | 428/172 |
| 3,769,119 | 10/1973 | Mizell et al. | 428/172 |
| 3,775,231 | 11/1973 | Thomas | 428/154 |
| 4,302,495 | 11/1981 | Marra | 428/110 |
| 4,413,623 | 11/1983 | Pieniak | 156/229 |
| 4,525,407 | 6/1985 | Ness | 156/229 |
| 4,551,378 | 11/1985 | Carey, Jr. | 428/198 |
| 4,606,964 | 8/1986 | Wideman | 428/152 |
| 4,636,419 | 1/1987 | Madsen et al. | 156/494 |
| 4,731,276 | 3/1988 | Manning et al. | 428/284 |
| 4,734,311 | 3/1988 | Sokolowski | 428/229 |
| 4,775,579 | 10/1988 | Hagy et al. | 428/284 |
| 4,786,549 | 11/1988 | Richards | 428/225 |
| 4,847,134 | 7/1989 | Fahrenkrug et al. | 428/152 |
| 4,863,779 | 9/1989 | Daponte | 428/198 |
| 4,970,104 | 11/1990 | Radwanski | 428/284 |
| 4,977,011 | 12/1990 | Smith | 428/292 |
| 4,984,584 | 1/1991 | Hansen et al. | 428/152 |

FOREIGN PATENT DOCUMENTS

0007802 2/1980 European Pat. Off. .

Primary Examiner—George F. Lesmes
Assistant Examiner—Kathryne Elaine Shelborne
Attorney, Agent, or Firm—Bell, Seltzer, Park & Gibson

[57] ABSTRACT

The invention provides composite elastic nonwoven fabrics and the process of making them. The composite elastic fabrics of the invention include an elastomeric net and at least one fibrous web including binder fibers and which is intimately hydroentangled with the elastomeric net. At least a portion of the binder fibers in the hydroentangled fibrous web have been thermally activated thereby bonding the hydro-entangled web into a coherent, substantially unitary structure encompassing the elastomeric net.

51 Claims, 3 Drawing Sheets

COMPOSITE ELASTIC NONWOVEN FABRIC

FIELD OF THE INVENTION

The invention relates to composite elastic nonwoven fabrics and to processes for producing them. More specifically, the invention relates composite nonwoven fabrics having desirable coherency, strength, conformability, and stretch and recovery properties.

BACKGROUND OF THE INVENTION

Nonwoven elastic fabrics have been the subject of considerable attention and effort. Elastic fabrics are desirable for use in bandaging materials, garments, diapers, supportive clothing and personal hygiene products because of their ability to conform to irregular shapes and to allow more freedom of body movement than fabrics with limited extensibility.

Elastomeric materials have been incorporated into various fabric structures to provide stretchable fabrics. In many instances, such as where the fabrics are made by knitting or weaving, there is a relatively high cost associated with the fabric. In cases where the fabrics are made using nonwoven technologies, the fabrics can suffer from insufficient strength and only limited stretch and recovery properties.

Elastomers used to fabricate elastic fabrics often have an undesirable rubbery feel. This is particularly true with thermoplastic elastomers rather than crosslinked elastomers. When these materials are used in composite nonwoven fabrics, the hand and texture of the fabric can be perceived by the user as sticky or rubbery and therefore undesirable.

U.S. Pat. No. 4,775,579 to Hagy, et al. discloses desirable composite elastic nonwoven fabrics containing staple textile fibers intimately hydroentangled with an elastic web or an elastic net. One or more webs of staple textile fibers and/or wood pulp fibers can be hydroentangled with an elastic net according to the disclosure of this invention. The resulting composite fabric exhibits characteristics comparable to those of knit textile cloth and possesses superior softness and extensibility properties. The rubbery feel traditionally associated with elastomeric materials can be minimized or eliminated in these fabrics.

U.S. Pat. No. 4,413,623 to Pieniak discloses a laminated structure such as a disposable diaper which can incorporate an elastic net into portions of the structure. The elastic net can be inserted in a stretched condition between first and second layers of the structure and bonded to the layers while in the stretched condition. Subsequent relaxation of the elastic net can result in gathering of the structure.

U.S. Pat. No. 4,525,407 to Ness discloses elastic fabrics which include an elastic member, which may be an elastic net, intermittently bonded to a substrate which prior to stretching is less easily extensible than the elastic member. The nonelastic member is bonded to the elastic member and the entire composite is rendered elastic by stretching and relaxation.

U.S. Pat. No. 4,606,964 to Wideman discloses a bulked composite web which can be prepared by bonding a gatherable web to a differentially stretched elastic net. Subsequent relaxation of the differentially stretched net is said to result in gathering of the fabric.

These and other elastic nonwoven fabrics and the processes for manufacturing them can suffer from various disadvantages. In some instances, the fibers are not firmly anchored into the composite web so that following repeated stretch and relaxation, fiber shedding and pilling can be problematic. In other instances, the nonwoven net is insufficiently integrated into the composite fibrous structure so that separation of the net can occur and/or the fabric can lose elastic properties. In other instances, the fabric exhibits a low extensibility which is well below the possible extensibility afforded by the elastic net. In addition, the manufacturing processes associated with prior art fabrics can involve complicated and difficult manufacturing steps increasing the cost of the fabric and/or decreasing the fabric uniformity.

SUMMARY OF THE INVENTION

The invention provides composite elastic nonwoven fabrics which are coherent and exhibit improved strength and elasticity properties. The fabrics can have a high degree of elasticity and stretch recovery while fiber shedding, pilling or fuzzing problems are minimized or eliminated. The fabrics can be provided with desirable softness characteristics. In various embodiments of the invention, differential elasticity can be provided in the fabrics of the invention.

The composite elastic nonwoven fabrics of the invention include an elastomeric net and a fibrous web intimately hydroentangled together. The fibrous web includes binder fibers and at least a portion of the binder fibers extend through apertures in the elastomeric net. The binder fibers in the hydroentangled fibrous web have been thermally activated to thereby bond the hydroentangled fibrous web into a coherent, substantially unitary structure encompassing the elastomeric net. Typically the binder fibers bond to themselves and may or may not bond to other fibers or to the net in the structure.

The composite nonwoven elastic fabrics of the invention can be manufactured by relatively simple and straightforward manufacturing processes which involve forming a layered structure including the binder fiber-containing fibrous web and the elastomeric net; hydroentangling the layered structure; and then thermally treating the hydroentangled fabric. Hydroentangling and bonding can be accomplished with or without stretching of the elastic net to provide a highly elastic and coherent composite fabric. Thermal bonding can be accomplished employing any of various well known process steps including ultrasonics, calender rolls or through-air bonding, and is preferably accomplished using heated calender rolls or through-air bonding. Although patterned calender rolls can be employed, advantageously smooth calender rolls are employed for bonding the composite web.

Various textile staple fibers such as polyolefins, polyesters, nylon, and the like, and/or wood pulp fibers are preferably included in the fibrous web which is hydroentangled with the elastomeric net. These fibers provide desirable aesthetic qualities to the composite fabric. The elastomeric net is advantageously maintained within the interior of the fabric so that the fabric does not have a rubbery feel or hand. Because binder fibers are incorporated into the fibrous web, the composite fabric possesses a unitary coherent structure and the textile and/or wood pulp fibers are firmly anchored in the composite web.

In preferred embodiments of the invention, separate fibrous webs containing binder fibers are disposed on opposite sides of the elastomeric net prior to hydroentangling. This ensures that the elastomeric net is confined within the interior of the composite fabric and that sufficient textile fibers are provided on each side of the elastomeric net so that the hand and coherent nature of the fabric is improved.

Additionally, it is preferred that less than about 50 wt. % of the fibers of the fibrous layer or layers are binder fibers so that the composite elastic fabric resulting from thermal treating has improved drapability and softness. Various binder fibers can be employed in the invention. Preferably, bicomponent fibers including side-by-by and sheath-core bicomponent fibers are employed as binder fibers in the fabrics of the invention.

The invention also provides fabrics having anisotropic stretch properties, i.e., directionalized stretch properties, by employing elastomeric nets having different stretch properties in the longitudinal net strands and the transverse net strands. Thus, elastomeric nets in which only the strands of one direction, e.g., only the longitudinal, or only the transverse strands, are elastomeric, can be employed to provide composite fabrics having elasticity in only the longitudinal or only the transverse dimension, respectively. Alternatively, elastomeric materials having different mechanical properties can be employed for the longitudinal and transverse elastomeric net strands.

BRIEF DESCRIPTION OF THE DRAWINGS

In the drawings which form a portion of the original disclosure of the invention.

DETAILED DESCRIPTION OF THE INVENTION

In the following detailed description of the invention, specific preferred embodiments of the invention are described to enable a full and complete understanding of the invention. It will be recognized that it is not intended to limit the invention to the particular preferred embodiments described, and although specific terms are employed in describing the invention, such terms are used in the descriptive sense for the purpose of illustration and not for the purpose of limitation. It will be apparent that the invention is susceptible to variation and changes within the spirit of the teachings herein.

Figure 1:
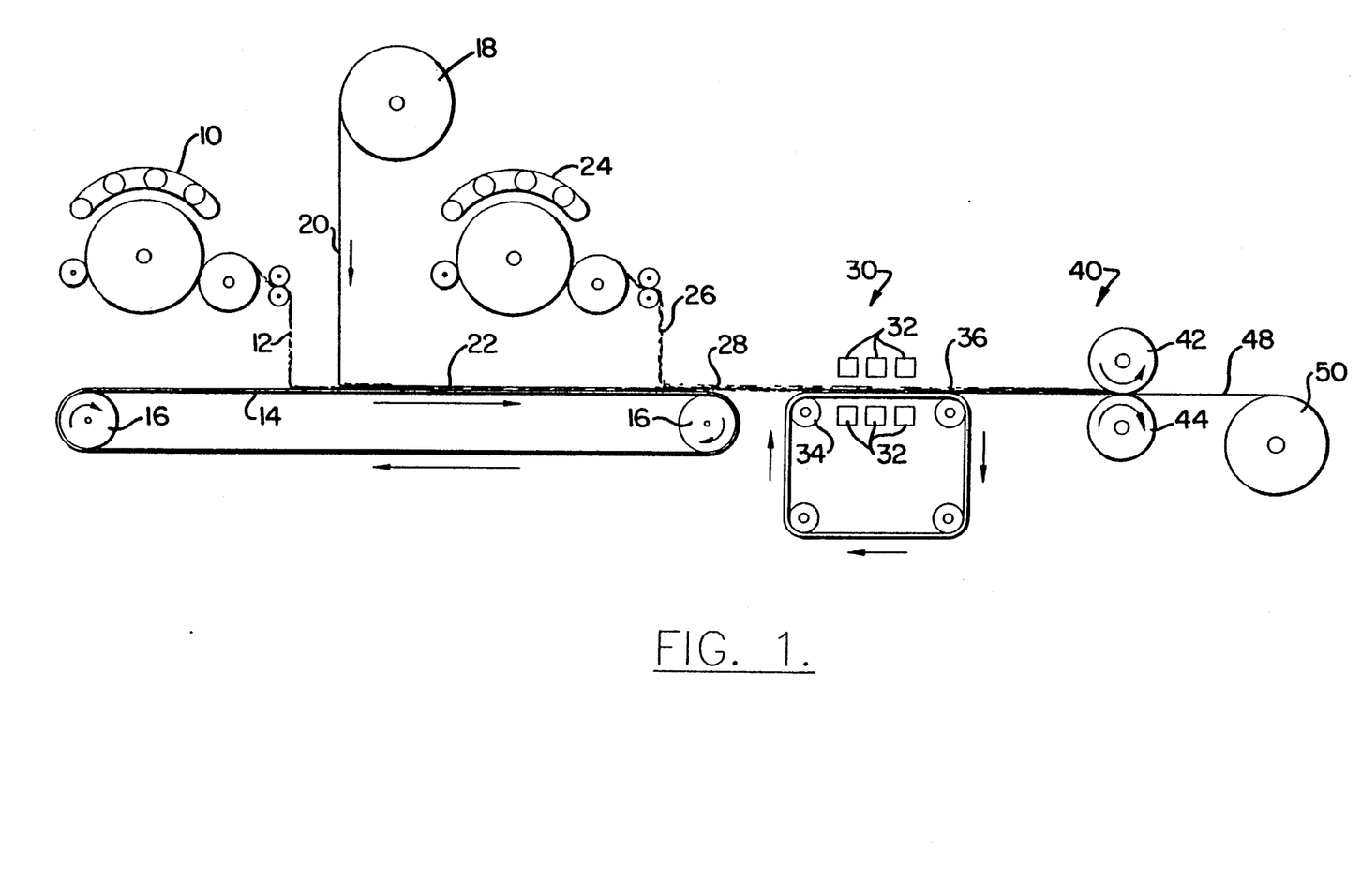
FIG. 1 schematically illustrates one preferred method and apparatus for manufacturing a preferred composite elastic nonwoven web according to the invention.

FIG. 1 schematically illustrates a preferred process and apparatus for forming the composite nonwoven webs of the invention. A carding apparatus 10 forms a first carded layer 12 onto forming screen 14. Carded fibrous layer 12 includes binder fibers and preferably also includes synthetic or natural fibers. As explained in greater detail later the binder fibers are advantageously present in an amount of between about 10 and 50 wt. % in carded layer 12. Web 12 is moved by forming screen 14 in the longitudinal direction by rolls 16.

A conventional supply system including a supply roll 18 deposits an elastomeric net 20 onto carded layer 12. The elastomeric net includes spaced apart longitudinal and transverse strands which intersect to form apertures. In addition, irregular geometry nets such as diamond nets and the like can be used in place of net 20. With a rectangular net, for example, one or both of the longitudinal or transverse groups of strands are formed of a thermoplastic or crosslinked elastomeric material such as a polyurethane, a styrene triblock copolymer, or the like, as discussed in greater detail later. Preferably, the longitudinal and transverse strands are provided in an amount such that there are between about 5 and about 30 or more strands per inch.

As the net 20 is deposited onto carded web 12, a two layer structure 22 is formed and is conveyed by forming screen 14 in the longitudinal direction as indicated in FIG. 1. A second carding apparatus 24 deposits a second carded fibrous layer preferably comprising binder fibers onto the composite layered structure 22 to thereby form a three-layer composite structure 28 consisting of a carded web/elastomeric net/carded web. The binder fibers and other fibers making up carded web 26 can be the same or different as compared to the fibers in carded web 12. The content of binder fibers in carded web 26 can be the same or different as compared to the content of binder fibers in carded web 12.

The three-layer composite web 28 is conveyed longitudinally as shown in FIG. 1 to a hydroentangling station 30 wherein a plurality of manifolds 32, each including one or more rows of fine orifices, direct high pressure jets through the composite web 28 to intimately hydroentangle the fibers in the webs 12 and 26 with each other and with elastomeric net 20. As a result of the hydroentangling treatment, at least a portion of the fibers in each of the carded layers 12 and 26 extend through apertures in the elastomeric net and into the carded layer on the other side of the net.

The hydroentangling station 30 is constructed in a conventional manner as known to the skilled artisan and as described, for example, in U.S. Pat. No. 3,485,706 to Evans, which is hereby incorporated by reference. As known to the skilled artisan, fiber hydroentanglement is accomplished by jetting liquid, typically water, supplied at a pressure from about 200 psig up to about 1800 psig or greater, to form fine, essentially columnar liquid streams. The high pressure liquid streams are directed to at least one surface of the composite layered structure. The composite is supported on a foraminous support stream 34 which can have a pattern to form a nonwoven structure with a pattern or with apertures, or the screen can be designed and arranged to form a hydraulically entangled composite which is not patterned or apertured. The laminate can be passed through a second hydraulic entangling station to enable hydraulic entanglement on the other side of the composite web fabric.

During the hydroentanglement treatment, the binder fibers and the staple or natural fibers, when present, in carded web layers 12 and 26 are forced into and/or through the elastomeric net 20. Preferably, the hydroentangling treatment is sufficient to force at least a portion of the binder fibers present in at least one of the layers 12 and 26 into and/or through the apertures in the elastomeric net 20. More preferably, the hydroentangling treatment is sufficient to force at least a portion of the binder fibers in both carded layers 12 and 26 into and/or through the apertures in the elastomeric net 20. It is also desirable and preferred that other fibers, when present, such as staple and/or natural fibers in webs 12 and 26 are forced into and through the apertures of the elastomeric web 20.

The elastomeric web remains in a substantially planer arrangement during the hydroentangling treatment. Thus, the longitudinal and transverse strands, i.e. machine direction (MD) and cross machine direction (CD) strands, respectively, of the elastomeric net 20 undergo little if any movement in the cross-sectional direction, i.e. the Z-direction, within the web. Thus, the elastomeric net remains in a discrete interior cross-sectional portion of the composite web.

A condensed, hydraulically entangled composite web 36 exits the hydroentanglement station 30, and is dried at a conventional drying station (not shown) and is then directed into a thermal treatment station 40, shown in FIG. 1 as heated calender rolls 42 and 44. The operating temperature of heated rolls 42 and 44 should be adjusted to a surface temperature such that the binder fibers present in the composite web 36 are thermally activated to bind the composite web into a coherent, unitary structure. On the other hand, the heat transfer conditions are advantageously maintained to avoid thermal degradation or melting of the elastomeric net 20 which is present within the interior of the composite web 36. The bonding conditions can, in some instances depending on the fibers and net used, be controlled to obtain fiber bonding to the net, while simultaneously avoiding thermal degradation of the elastomer or its stretch and recovery properties.

While softening of the elastomeric net 20 can, in some instances, be desirable and helpful for bonding of the binder fibers and/or staple fibers in the composite web to the net, melting of the elastomeric net is advantageously avoided. While the bonding between the binder fibers and/or other natural or staple fibers present in the composite web 36 to the elastomeric net 20 can substantially improve the overall coherency and unitary structure of the ultimate thermally bonded web, it has been found that melting and/or thermally degrading the elastomeric net 20 decreases both the strength and elasticity of the thermally bonded web.

A thermally-bonded composite elastic web 46 is removed from the nip of the heated rolls 42 and 44 and wound by conventional means onto roll 50. The composite elastic web 48 can be stored on roll 50 or immediately passed to end use manufacturing processes, for example for use in bandages, diapers, disposable undergarments, personal hygiene products and the like.

The method illustrated in FIG. 1 is susceptible to numerous preferred variations. For example, although the schematic illustration of FIG. 1 shows carded webs being formed directly during the in-line process, it will be apparent that the carded webs can be preformed and supplied as rolls of preformed webs. Similarly, although the elastomeric net is shown being supplied as a roll of a preformed net, the net can be formed directly in-line. Similarly, although FIG. 1 illustrates use of fibrous webs 12 and 26 both above and below the elastomeric net 20, only a single fibrous web such as web 12 can be employed or more than two fibrous webs can be employed.

The heated calender rolls 42 and 44 can, in other embodiments of the invention, be replaced by other thermal activation zones, for example in the form of a through-air bonding oven or in the form of a microwave or other RF treatment zone. An especially preferred through-air bonding treatment employs support screens both above and below the fabric and contacting both surfaces thereof during passage through the oven. The screens are advantageously metallic screens resulting in conductive heating of both fabric surfaces by contact with the upper and lower metal screens, respectively. Other heating stations such as ultrasonic welding stations can also be advantageously used in the invention. Such conventional heating stations are known to those skilled in the art and are capable of effecting substantial thermal fusion of the binder fibers present in the composite web 36.

Nonwoven webs other than carded webs are also advantageously employed in the production of fabrics of the invention. Nonwoven staple webs can be formed by air laying, garnetting, wet laying and similar processes known in the art. Spunbonded webs which are extensible in the MD or CD direction because of little or no filament-to-filament bonding can be substituted for either or both of carded webs 12 and 26 and/or can be used in combination with one or both of carded webs 12 and 26. Similarly, meltblown webs which are extensible in either or both of the MD and CD direction can be substituted for either of carded webs 12 and 26 and/or can be used in conjunction with one or both of carded webs 12 and 26.

Figure 2:
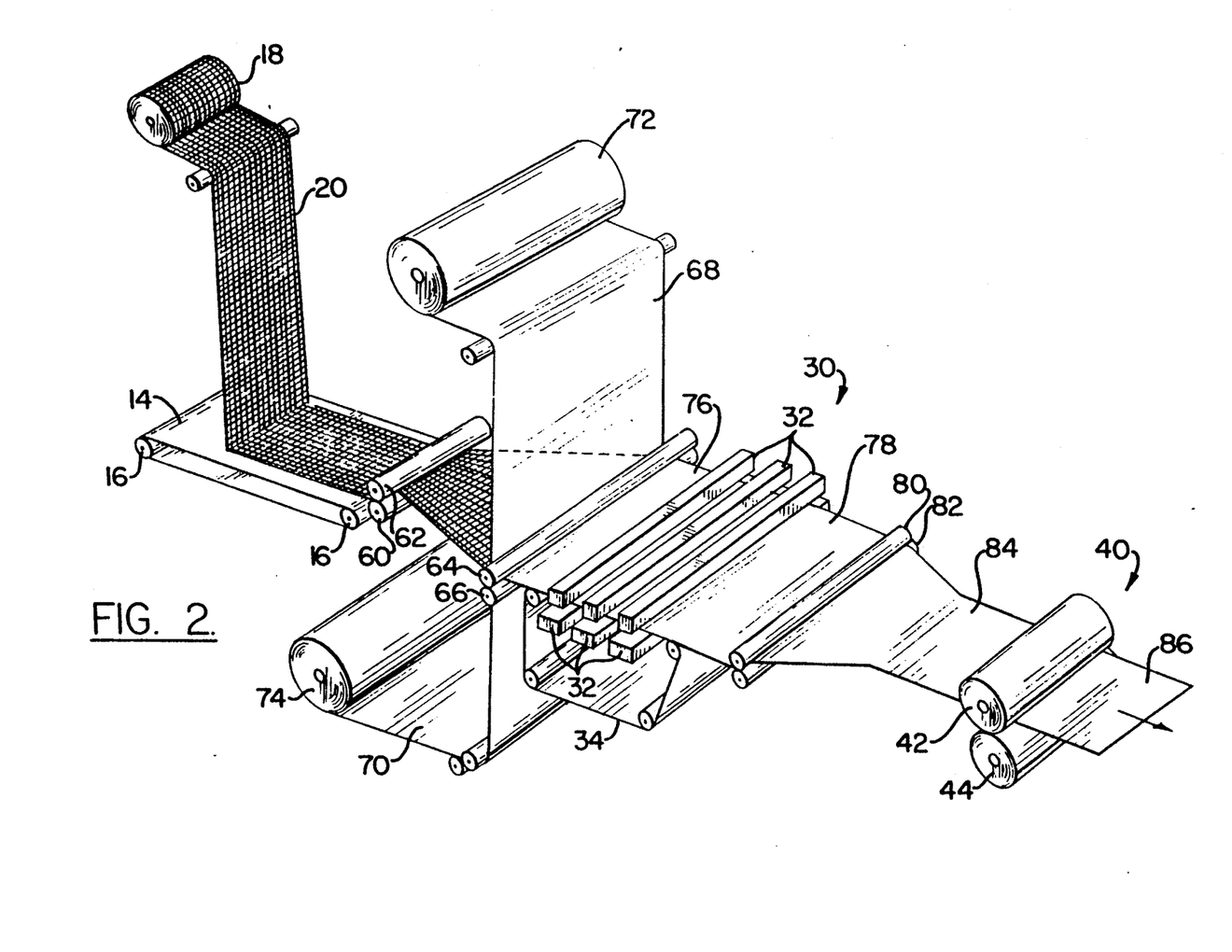
FIG. 2 schematically illustrates another preferred method and apparatus for the manufacture of another preferred fabric according to the invention.

FIG. 2 illustrates a process of the invention wherein elastomeric net 20 is stretched in the CD and/or MD direction during hydroentanglement of the composite fabric. Elastomeric web 20 is deposited onto a screen 14 and fed via a pair of feed rolls 60, 62 to a pair of stretching rolls 64, 66. Rolls 64 and 66 may be operated at a speed greater than rolls 60 and 62 thereby stretching the net 20 in the MD at the same time the net is expanded in the CD. Clamps or a tenter frame are typically required (not shown) for CD stretching to minimize necking.

Two preformed webs 68 and 70 are fed via supply rolls 72 and 74, respectively, to the feed rolls 64 and 66 for layering with the net 20 while it is in the stretched condition. One or both of webs 68 and 70 includes binder fibers, preferably in an amount of 10–50 wt. %. It is also preferred that at least one of webs 68 and 70 is a staple fiber web which can be preformed via air laying, garnetting or carding. In addition, at least one of the webs 68 and 70 can preferably constitute a spunbond or a meltblown web.

The combined 3-layer structure 76 is passed through hydroentangling station 30 while the net 20 is maintained in a stretched condition by down-stream rollers 80 and 82. Clamps or tentering again may be required if the web is stretched in the CD and tends to neck. High pressure water jets from manifolds 32 force fibers from the fibrous webs 68 and 70 through the apertures of the stretched elastic net 20 during passage through the hydroentangling station.

The hydroentangled and consolidated structure 78 issuing from the hydroentangling station 30 is thereafter allowed to relax and is then dried by conventional means such as an oven (not shown). The thus dried and relaxed composite web 84 is passed through a thermal bonding station 40 comprising heated calender rolls 42 and 44 for thermal activation of the thermal binder fibers in the consolidated web 84. As shown in FIG. 2, the thermal treatment of the consolidated web 84 is advantageously conducted while the elastomeric net 20 is in a relaxed condition, although thermal treatment can be conducted while the web is maintained in a stretched condition if desired. As in the previously described process illustrated in FIG. 1, the thermal treatment at thermal treating station 40 is advantageously conducted such that heat transfer is sufficient to melt the binder fibers but insufficient to thermally deform the elastomeric net 20. The degree of temperature control which is required will be dependent, in part, on the type of elastomer used in the net. For example, if cross-linked rather than thermoplastic elastomers (TPE's) are used, the need to tightly control heat transfer conditions is less urgent.

The thermally treated coherent web 86 issuing from the heated calender rolls 42 and 44 is passed to storage or end use applications.

The process illustrated in FIG. 2 is particularly advantageous for preparing an elastomeric composite web wherein one or more of the webs employed to make the composite are a spunbonded or meltblown web. Because meltblown and spunbonded webs typically have only limited extensibility in either the MD or CD direction, integration of such webs with the elastomeric net while the net is in a stretched condition allows the resultant composite web to have an extensibility following relaxation and thermal treatment, while retaining some of the characteristics of the component fabrics. When spunbonded webs are incorporated, an abrupt increase in the modulus of the composite fabric can be achieved. When the composite is extended to the same degree used in its manufacture, the tensile properties of the spunbond dominate the elastic properties of the net. When meltblown webs are incorporated, the resulting composite retains the high cover and barrier properties associated with meltblown fibers.

It is preferred that when spunbond and/or meltblown webs are employed in the process illustrated in FIG. 2 that at least one web combined into the composite web 76 include binder fibers in staple form. The use of binder fibers in staple form allows the binder fibers to become fully integrated through the structure of the elastomeric net and preferably also through the structure of the meltblown or spunbonded web when used. It is also preferred that non-binder staple fibers be also included in one of the nets combined in the hydroentangling station 30 so that the non-binder fibers also are employed for integration of the composite elastomeric web.

As with the process illustrated in FIG. 1, the process illustrated in FIG. 2 is susceptible to numerous variations. Thus, the thermal treating station 40 can comprise any of the previously described thermal treating stations. Likewise, the fibrous webs 68 and 70 can be formed in-line where desirable. Moreover, although net 20 is shown in FIG. 2 as stretched in both the MD and CD directions, stretching can be carried out in only the MD, or in only the CD direction during consolidation of the net with the fibrous webs 70 and 72 by hydroentanglement. Additionally although two fibrous webs 68 and 70 are shown in FIG. 2, only one, or more than two fibrous webs can be combined with the stretched net 20 during the hydroentanglement and thermal bonding steps accomplished at stations 30 and 40.

Figure 3:
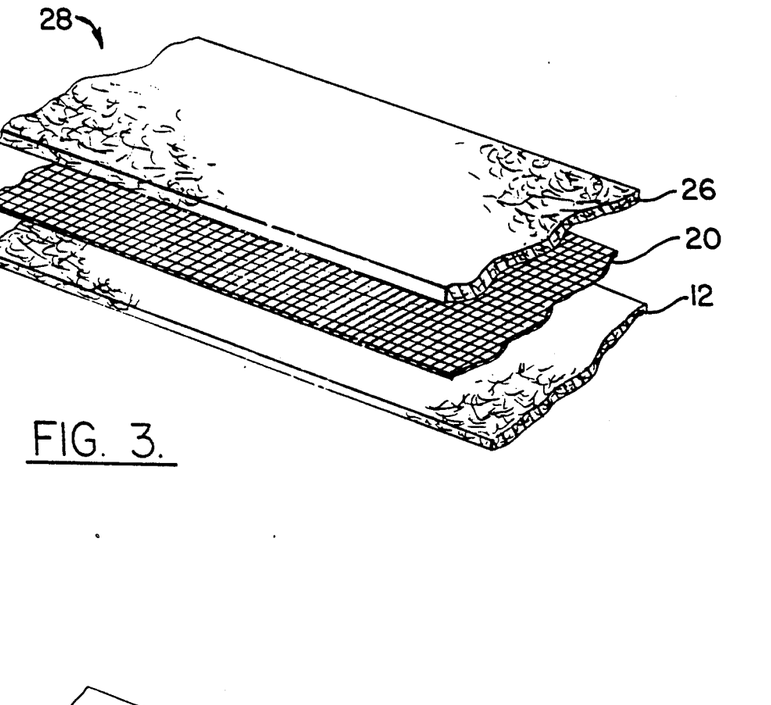
FIG. 3 illustrates a fragmentary exploded view of preferred intermediate layered structure employed in the production of elastic nonwoven fabrics according to the invention.

FIG. 3 illustrates an exploded view of the three layered structure 28 of FIG. 1 prior to hydroentanglement. At least one of the carded web layers 12 and 26 comprises binder fibers in an amount greater than about 5%, preferably greater than about 10% by weight. Binder fibers are known in the art and include fibers made from low melting polyolefins such as polyethylenes; polyamides and particularly copolyamides; polyesters and particularly copolyesters; acrylics and the like. The binder fiber may have a higher or lower activation temperature than the melting or softening point of the net. In the case that the binder fiber activates above the glass transition temperature of the hard segment of the thermoplastic elastomer, then heating conditions must be closely controlled to bind the fibers without deforming or degrading the net.

Particularly preferred binder fibers include bicomponent and multi-component fibers such as sheath/core, side-by-side, sectorized or similar bicomponent fibers wherein at least one component of the fiber is a low melting material such as a polyethylene, a copolyester, a copolyamide, or the like. Particularly preferred bicomponent fibers have a melting temperature for the binder portion of the fiber in the range of between about 100° and 135° C. Such fibers include polypropylene/polyethylene and polyester/polyethylene sheath/core fibers and polyester/copolyester sheath/core fibers. One particularly preferred binder fiber is a copolyester/polyester sheath/core fiber having a melting point of about 110° C. commercially available from Hoechst-Celanese Corporation as "K-54".

Preferably, each of webs 12 and 26 also include staple and/or natural fibers such as fibers formed from polyester, polyolefins such as polypropylene or polyethylene, nylon, acrylic, modacrylic, rayon, cellulose acetate, biodegradable synthetics such as a biodegradable polyester, aramide, fluorocarbon, polyphenylene sulfide staple fibers and the like. Preferred natural fibers include wool, cotton, wood pulp fibers and the like. Blends of such fibers can also be used. In addition, all or a portion of the staple fibers can be glass, carbon fibers or the like.

As indicated previously, the binder fibers are preferably present in an amount of between about 10 and 50 wt. %, more preferably between about 20 and about 40 wt. %, most preferably between about 25 and 35 wt. %. The content of the binder fiber is adjusted to provide coherency to the overall combined web without adding an undesirably stiff or boardy feeling to the web. The specific content of the binder fiber will be dependent, at least to some extent, on the type of binder fiber used and on the type of staple fiber used.

The elastic net 20 includes an elastic material making up either or both of the longitudinal, i.e. machine direction, strands and/or the transverse, i.e. cross machine direction, strands, (assuming the net is rectangular). Suitable elastomers include the diblock and triblock copolymers based on polystyrene (S) and unsaturated or fully hydrogenated rubber blocks. The rubber blocks can consist of butadiene (B), isoprene (I), or the hydrogenated version, ethylene-butylene (EB). Thus, S-B, S-I, S-EB, as well as S-B-S, S-I-S, and S-EB-S block copolymers can be used. Preferred elastomers of this type include the KRATON polymers sold by Shell Chemical Company or the VECTOR polymers sold by DEXCO. Other elastomeric thermoplastic polymers include polyurethane elastomeric materials such as ESTANE sold by BF Goodrich Company; polyester elastomers such as HYTREL sold by E.I. Du Pont De Nemours Company; polyetherester elastomeric materials such as ARNITEL sold by Akzo Plastics; and polyetheramide elastomeric materials such as PEBAX sold by ATO Cheme Company.

The elastic strands in the elastomeric net 20 can also be prepared from blends of thermoplastic elastomers with other polymers such as polyolefin polymers, e.g. blends of KRATON polymers with polyolefins such as polypropylene and polyethylene, and the like. These polymers can provide lubrication and decrease melt viscosity, allow for lower melt pressures and temperatures and/or increase throughput, and provide better bonding properties too. In a particularly preferred embodiment of the invention, polymers can be included in the blend as a minor component, for example in an amount of from about 5% by weight up to about 50% by weight, preferably from about 10 to about 30% by weight. Suitable thermoplastic materials include poly(ethylene-vinyl acetate) polymers having an ethylene content of up to about 50% by weight, preferably between about 15 and about 30% by weight, and copolymers of ethylene and acrylic acid or esters thereof, such as poly(ethylene-methyl acrylate) or poly(ethylene-ethyl acrylate) wherein the acrylic acid or ester component ranges from about 5 to about 50% by weight, preferably from about 15 to 30% by weight.

As indicated previously, the degree of elasticity of the longitudinal and transverse strands of a rectangular elastomeric net can be the same or different. Fabrics having differential stretch in the longitudinal and transverse directions can be provided in accordance with the invention by employing strands in the elastomeric net in either the transverse or longitudinal direction which have little or no elasticity.

In many instances, it is desirable that the number of strands per inch in the longitudinal and transverse dimensions be different. Generally, there are between about 2 to about 30 strands per inch in both the longitudinal and transverse directions although greater numbers of strands can be employed where desirable. In some instances, the fabric of the invention can be used in articles wherein an edge of the fabric is exposed. In such instances it can be desirable to minimize the diameter of the strands which will be exposed along the cut edge of the fabric. Generally, the elastomeric nets used in the invention will have a basis weight ranging from about 15 grams per square meter, to about 200 grams per square meter, more preferably from about 35 to about 75 grams per square meter and can employ strands having diameters ranging from 50 to 600 microns.

As indicated previously, the fabrics of the invention can also incorporate spunbonded nonwovens, including polyolefin, nylon, polyester, copolymers of the same and other such webs as are known to those skilled in the art. Similarly, meltblown nonwovens including both elastomeric and non-elastomeric meltblown webs prepared from polyolefins, nylon, polyesters, random and block copolymers, elastomers and the like are also employed in fabrics of the invention.

Figure 4:
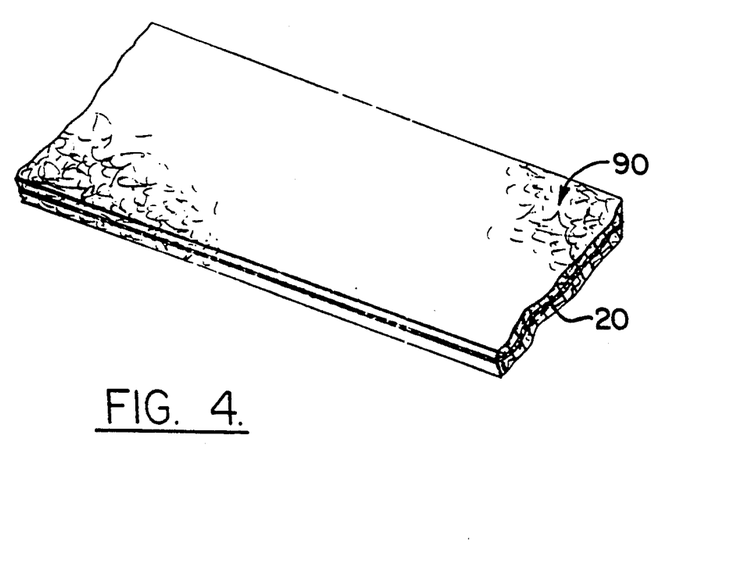
FIG. 4 illustrates a fragmentary perspective view of a composite fabric of the invention showing the exterior fibrous surface of the fabric and the interior elastomeric net which has been integrated with the fibrous webs shown.

FIG. 4 illustrates an exploded fragmentary view of a fabric according to the invention. As illustrated in FIG. 4, the elastomeric net is fully encompassed within the fibrous portion of the composite web. The fibers of the fibrous portion of the web extend through the apertures in the net and thus the fabric is a unitary coherent fabric. Because the binder fibers bind the fibers in the fibrous web together, the fabric is not prone to delamination and problems with fuzziness and lintiness can be avoided. Despite the use of binder fibers the composite fabric possesses substantial elasticity. The elastomeric net 20 does not contribute a rubbery like feel to the surface 90 of the fabric because the net is maintained within the interior of the fabric.

The following examples are provided to illustrate the fabrics of the invention and processes for making them but are not to be construed as limitations on the invention.

In all examples set forth below a styrene-butadiene-styrene triblock thermoplastic elastomer, sold under the trade name KRATON D 2104 by Shell Chemical, was used as the elastomer in the elastic net.

EXAMPLES 1 THROUGH 5

These examples demonstrate the effects of bonding and pre-stretching on fabric properties. All the samples were produced with a fiber blend of:

0.70 wt. % 2.2 dpf×1.5" Type-182 Herculon ® polypropylene staple fiber from Hercules,
0.30 wt. % 2.0 dpf×1.5" K-54 copolyester/polyester bicomponent fiber from Hoechst Celanese Corp.

The composites all consist of a sandwich with: a 33 g/m² basis weight layer of carded, blended fiber; a 170 g/m² basis weight 18×9 (strands/inch, MD ×CD) rectangular elastic net; and an additional 33 g/m² layer of carded, blended fiber. The total fiber basis weight in the composite is 66 g/m².

All samples were entangled on a 31×25 (strands/inch) screen at 240 ft/min with two passes at 400 psi and four passes at 1400 psi for each side. The examples differ by thermal treatment and prestretching.

Examples 1, 2 and 3 were not pre-stretched; they were hydroentangled with the net under minimal tension and in its relaxed state. The samples were then dried prior to the thermal treatments set forth below.

In Examples 4 and 5 the net was pre-stretched 100% in the MD and was entangled in the stretched state. After entanglement, the composite fabric was relaxed and dried. It was then ready for thermal treatment as set forth below.

The fabrics of Examples 1 and 4 were not thermally treated while the fabrics of Examples 2, 3 and 5 were. The fabrics of Examples 2 and 5 were thermally treated through a double-wire through-air bonding oven at 155° C. The fabric of Example 3 was thermally treated by calendering with two smooth rolls at 100 ft/min, with a calender gap of 0.023", and calender roll temperature of 135° C. for each roll.

The properties of these fabrics are shown in Table 1, below. Example 1 was un-bonded and could be stretched readily in both directions. It was easy to delaminate however, with a peel strength of only 316 grams. Example 2, on the other hand, was through-air bonded. It was very difficult to delaminate. The peel strength was over 5000 g, and the there was adhesive failure in the peel tape prior to a cohesive failure of the fabric. This result clearly demonstrates how bonding gives a coherent structure.

Example 3 was unstretched and calender-bonded. It too had a higher peel strength than Example 1, but not nearly as high as Example 2 (through-air bonded). Examples 2 and 3 both stretched easily in the cross-machine direction (CD), but due to fiber orientation and bonding, were much more resistant to stretching in the machine direction (MD), as demonstrated in MD tensile strength results.

Finally, Examples 4 and 5 were pre-stretched 100% in the MD prior to hydroentanglement. Both the bonded and un-bonded versions were easy to stretch in both directions. Another benefit of bonding is demonstrated here; namely, fabric toughness. The bonded version was much tougher, and required more force to elongate than the un-bonded version.

All bonded fabrics have less propensity to pill, fuzz, and/or shed fibers.

Table 1 provides a summary of the fabrics and their associated mechanical properties.

TABLE 1

Description and Properties of Examples 1 Through 5.

| ITEM | EXAMPLE 1 | | EXAMPLE 2 | | EXAMPLE 3 | | EXAMPLE 4 | | EXAMPLE 5 | |
|---|---|---|---|---|---|---|---|---|---|---|
| Pre-stretch | none | | none | | none | | 100% MD | | 100% MD | |
| Heat Treatment | none | | through-air | | calender | | none | | through-air | |
| Strip Tensile Test: | MD | CD | MD | CD | MD | CD | MD | CD | MD | CD |
| Load (g/in) @ 25% el. | 472 | 172 | 2197 | 272 | 656 | 190 | 121 | 174 | 212 | 299 |
| Load (g/in) @ 50% el. | 1174 | 239 | 2991 | 459 | 1752 | 264 | 185 | 252 | 357 | 615 |
| Load (g/in) @ 75% el. | 1487 | 295 | 2569 | 585 | 2252 | 313 | 253 | 317 | 700 | 904 |
| Load (g/in) @ 100% el. | 1029 | 325 | 1678 | 680 | 2078 | 355 | 356 | 386 | 1206 | 1115 |
| Peak Load (g/in) | 2157 | 2251 | 3103 | 2183 | 2292 | 1922 | 2757 | 2163 | 3006 | 2308 |
| Elongation (%) at Peak | 963 | 1005 | 61 | 1002 | 83 | 1033 | 317 | 781 | 237 | 897 |
| Cycle Test: Load (g/in) at 50% Elongation | | | | | | | | | | |
| Pull 1 | 930 | 261 | 2898 | 482 | 2109 | 273 | 201 | 258 | 407 | 676 |
| Pull 2 | 530 | 294 | 1910 | 403 | 1168 | 245 | 188 | 228 | 322 | 554 |
| Pull 3 | 433 | 223 | 1614 | 380 | 858 | 238 | 182 | 222 | 320 | 514 |
| % Set @ 50% el. | 3.5% | 3.3% | 4.3% | 3.6% | 3.8% | 3.4% | 3.6% | 3.5% | 3.7% | 3.8% |
| Cycle Test: Load (g/in) at 100% Elongation | | | | | | | | | | |
| Pull 1 | 1749 | 335 | 2814 | 681 | 1160 | 372 | 406 | 404 | 1466 | 989 |
| Pull 2 | 585 | 294 | 874 | 551 | 598 | 325 | 348 | 343 | 1050 | 755 |
| Pull 3 | 484 | 285 | 671 | 502 | 454 | 312 | 337 | 323 | 1001 | 689 |
| % Set @ 100% el. | 6.0% | 3.8% | 5.9% | 4.5% | 3.9% | 4.3% | 3.7% | 3.8% | 9.9% | 4.7% |
| Caliper (mils) | 74 | | 59.3 | | 46 | | 103 | | 94 | |
| Delamination: Peel Strength (g) | 316 | | >5000* | | 473 | | >5000* | | >5000* | |

*Peel was greater than 5000 g; adhesive failure of tape in peel test occurred before cohesive failure of the composite nonwoven fabric.

EXAMPLES 6 AND 7

The fabrics of Examples 6 and 7 were made much like the Examples 4 and 5, with the inclusion of a layer of spunbonded nylon to act as a "stop" in the fabric.

The composites were made by using the fiber blend of Examples 1–5, i.e., 70 wt. % 2.2 dpf×1.5" Type-182 Herculon ® polypropylene staple fiber from Hercules, 30 wt. % 2.0 dpf×1.5" K-54 copolyester/polyester bicomponent fiber from Hoechst Celanese Corp.

A four-layer laminate was formed consisting of:

(1) a 33 g/m² carded layer of the above fiber blend,
(2) a 170 g/m² rectangular, 18×9 (strand/inch, MD×CD) elastic net stretched 100% in the MD,
(3) a 10 g/m² layer of PBN-II ® spunbonded nylon, and finally,
(4) a 33 g/m² carded layer of the previous fiber blend.

The materials were entangled with the net in the stretched position (100% elongation in the MD). Both fabrics were then relaxed and dried. The fabric of Example 6 underwent no thermal treatment, and that of Example 7 was bonded in a double-wire through-air oven at 155° C.

The resulting material was gathered in the MD and had limited elasticity in the CD. It exhibited high extensibility in the MD, and good opacity as it extends. Once 100% elongation is reached, the PBN-II ® spunbonded nylon acts as a "stop" to inhibit further elongation.

EXAMPLES 8 AND 9

Examples 8 and 9 were also made much like the Examples 4 and 5, but this time a polypropylene meltblown material was included in the structures.

The composites were made by using the fiber blend of Examples 1–7, i.e., 70 wt. % 2.2 dpf×1.5" Type-182 Herculon ® polypropylene staple fiber from Hercules, 30 wt. % 2.0 dpf×1.5" K-54 copolyester/polyester bicomponent fiber from Hoechst Celanese Corp.

A four-layer laminate was formed consisting of:

(1) a 33 g/m² carded layer of the above fiber blend,
(2) a 170 g/m² rectangular, 18×9 (strand/inch, MD×CD) elastic net stretched 100% in the MD,
(3) a 13 g/m² layer of meltblown polypropylene, and finally,
(4) a 33 g/m² carded layer of the previous fiber blend.

The materials were entangled with the net in the stretched position. In both examples, the fabrics were then relaxed and dried. In Example 8 the fabric was subjected to no thermal treatment, and Example 9 the fabric was bonded in a double-wire through-air oven at 155° C.

Properties of the fabrics of Examples 6 through 9 are set forth below. Examples 6 through 9 again demonstrate how bonding gives a coherent composite. The un-bonded versions were easier to delaminate than the bonded version. Examples 6 and 8, unbonded composites, had peel strengths of 771 grams and 180 grams, respectively. Examples 7 and 9, through-air bonded composites, had peel strengths over 5000 grams (these samples also had an adhesive failure of the peel tape prior to any cohesive failure of the fabric). In addition, the bonded versions also demonstrated much higher tensile strengths than the unbonded versions, but still had good stretch and recovery properties. Finally, as with previous examples, the bonded versions had much less fuzz and pilling of fibers.

Table 2 describes Examples 6–9 and also includes basic mechanical properties.

TABLE 2
Description and Properties of Examples 6 Through 9.

| ITEM | EXAMPLE 6 | | EXAMPLE 7 | | EXAMPLE 8 | | EXAMPLE 9 | |
|---|---|---|---|---|---|---|---|---|
| Pre-stretch | 100% MD | | 100% MD | | 100% MD | | 100% MD | |
| Heat Treatment | none | | through-air | | none | | through-air | |
| Additional Layer | PBN-II SB nylon | | PBN-II SB nylon | | MB polypropylene | | MB polypropylene | |
| Strip Tensile Test: | MD | CD | MD | CD | MD | CD | MD | CD |
| Load (g/in) @ 25% el. | 122 | 808 | 271 | 1025 | 109 | 199 | 188 | 324 |
| Load (g/in) @ 50% el. | 190 | 1578 | 663 | 2076 | 167 | 312 | 303 | 618 |
| Load (g/in) @ 75% el. | 272 | 1637 | 1475 | 2323 | 227 | 413 | 559 | 864 |
| Load (g/in) @ 100% el. | 579 | 1759 | 2640 | 2227 | 316 | 503 | 979 | 1055 |
| Peak Load (g/in) | 4120 | 1867 | 4873 | 2460 | 2211 | 2382 | 2762 | 1945 |
| Elongation (%) at Peak | 240% | 91% | 172% | 85% | 967% | 968% | 237% | 254% |
| Cycle Test: Load (g/in) at 50 Elongation | | | | | | | | |
| Pull 1 | 197 | 1805 | 312 | 2429 | 198 | 319 | 421 | 616 |
| Pull 2 | 185 | 1387 | 255 | 1955 | 185 | 278 | 344 | 506 |
| Pull 3 | 181 | 1303 | 244 | 1820 | 185 | 264 | 319 | 477 |
| % Set @ 50% el. | 3.6% | 3.7% | 3.8% | 4.2% | 3.3% | 3.8% | 3.8% | 4.1% |
| Cycle Test: Load (g/in) at 100% Elongation | | | | | | | | |
| Pull 1 | 705 | 1861 | 930 | 2655 | 391 | 507 | 1136 | 1165 |
| Pull 2 | 575 | 1239 | 693 | 1540 | 341 | 399 | 888 | 895 |
| Pull 3 | 529 | 1040 | 655 | 1406 | 322 | 329 | 795 | 802 |
| % Set @ 100% el. | 3.5% | 5.7% | 5.4% | 4.8% | 3.7% | 3.9% | 4.4% | 4.1% |
| Caliper (mils) | 120 | | 109 | | 128 | | 94 | |
| Delamination: Peel Strength | 771 | | >5000* | | 180 | | >5000* | |

*Peel was greater than 5000 g; adhesive failure of tape in peel test occurred before cohesive failure of the composite nonwoven fabric.

EXAMPLES 10–12: SCANNING ELECTRON MICROSCOPY

EXAMPLE 10

A rectangular, 25×15 (strands/inch, MD×CD) scrim was hydroentangled with a carded fiber blend of:
- 70 wt. % 1.5 dpf×1.5" Type-54W Dacron ® polyester staple fiber from Dupont,
- 30 wt. % 1.5 dpf×1.5" polypropylene/polyethylene sheath/core bicomponent fiber from Chisso.

The composite consisted of a sandwich with: a 31 g/m² layer of carded, blended fiber, 180 g/m² 25×15 elastic net, and an additional 31 g/m² layer of carded, blended fiber. The total fiber basis weight in the composite was 62 g/m².

The web was entangled in the un-stretched state on a 31×25 (strand/inch) screen at 240 ft/min with two passes at 400 psi and four passes at 1400 psi for each side. The fabric was dried and through-air bonded in a double-wire through-air bonder at 155° C. to form the final composite fabric.

Scanning electron microscopy indicated that the polyethylene sheath of the bicomponent fiber bonded to itself and also to the scrim. The polyester staple fiber was mobile and is not bonded to any elements of the composite.

EXAMPLE 11

A rectangular, 7×9 (strands/inch, MD ×CD) scrim was hydroentangled with a carded fiber blend of:
- 70 wt. % 2.2 dpf×1.5" Type-182 Herculon ® polypropylene staple fiber from Hercules,
- 30 wt. % 3.0 dpf×1.5" polypropylene/polyethylene bicomponent fiber from BASF.

The composite consisted of a sandwich with: a 31 g/m² layer of carded, blended fiber, 180 g/m² 7×9 elastic net, and an additional 31 g/m² layer of carded, blended fiber. The total fiber basis weight in the composite was 62 g/m².

The web was entangled in the un-stretched state on a 31×25 (strand/inch) screen at 240 ft/min with two passes at 400 psi and four passes at 1400 psi for each side. The material was dried and through-air bonded in a double-wire through-air bonder at 155° C. to form the final composite fabric.

Scanning electron microscopy indicated that the polyethylene sheath of the bicomponent fiber bonded to itself and also to the scrim. There was also some very light bonding between the polyethylene sheath and the polypropylene staple fiber, but the adhesion appeared to be poor and the bond-strength weak.

EXAMPLE 12

A rectangular, 18×9 (strands/inch, MD×CD) scrim was hydroentangled with a carded fiber blend of:
- 70 wt. % 2.2 dpf×1.5" Type-182 Herculon ® polypropylene staple fiber from Hercules,
- 30 wt. % 2.0 dpf×1.5" K-54 copolyester/polyester bicomponent fiber from Hoechst Celanese Corp.

The composite consisted of a sandwich with: a 33 g/m² layer of carded, blended fiber, 180 g/m² 7×9 elastic net, and an additional 33 g/m² layer of carded, blended fiber. The total fiber basis weight in the composite was 66 g/m².

The web was entangled in the un-stretched state on a 20×13 (strand/inch) screen at 60 ft/min with two passes at 400 psi and four passes at 1000 psi on one side, and then entangled on the other side with a 31×25 screen at the same entanglement conditions. The material was dried and calendered on a smooth-smooth calender at 100 ft/min, calender gap of 0.023", and calender roll temperature of 135° C. for each roll.

Scanning electron microscopy indicated that the copolyester portion of the bicomponent fiber bonded to itself and not to the scrim. The polypropylene staple fiber was mobile and is not bonded to any elements of the composite.

A summary of these bonding results is shown in Table 3.

TABLE 3

Summary of Bonding Results.

| ITEM | EXAMPLE 10 | EXAMPLE 11 | EXAMPLE 12 |
| --- | --- | --- | --- |
| Staple Fiber | polyester | polypropylene | polypropylene |
| Bicomponent Binder Fiber | polyethylene sheath poly-propylene core | polyethylene sheath polyester core | copolyester sheath polyester core |
| Bonding of Binder Fiber to: | | | |
| itself | yes | yes | yes |
| staple | no | yes, but weak | no |
| net | yes | yes | no |

That which is claimed is:

1. A composite elastic nonwoven fabric comprising: an elastomeric net having a plurality of apertures; a fibrous web comprising at least about 10 wt. % binder fibers, said binder fibers comprising at least one low melting material having a melting temperature between about 100 and about 135° C., said fibrous web additionally comprising non-binder fibers and being intimately hydroentangled with said net such that at least a portion of said binder fibers extend through at least a portion of the apertures in said net; and at least a portion of said binder fibers having been thermally activated thereby bonding said hydroentangled web into a coherent, substantially unitary structure encompassing said elastomeric net.

2. The nonwoven fabric of claim 1 wherein said fibrous web comprises binder fibers in an amount of between about 10 and about 50 wt. %.

3. The nonwoven fabric of claim 2 wherein said fibrous web comprises non-binder fibers selected from the group consisting of polyester, polyolefin, nylon, acrylic, modacrylic, rayon, cellulose acetate, wool, cotton and wood pulp.

4. The nonwoven fabric of claim 1 wherein said elastomeric net is substantially rectangular, and elastic in only one of the longitudinal or transverse directions.

5. The nonwoven fabric of claim 1 wherein said elastomeric net is substantially rectangular, and is elastic in both the longitudinal and transverse directions.

6. The nonwoven fabric of claim 1 wherein said elastomeric net is of a non-rectangular geometry, and is elastic in one direction and inelastic in another direction.

7. The non-woven fabric of claim 1 wherein said elastomeric net is of a non-rectangular geometry, and is elastic in all directions.

8. The nonwoven fabric of claim 1 wherein said elastomeric net is maintained in a stretched condition during hydroentangling of said fibrous web and said net.

9. The nonwoven fabric of claim 1 wherein said hydroentangled elastic net is thermally treated in the stretched state.

10. The nonwoven fabric of claim 1 wherein said hydroentangled elastic net is thermally treated in the relaxed state.

11. The nonwoven fabric of claim 1 additionally comprising a web of continuous filaments, bonded or unbonded, hydroentangled with said fibrous web and said net.

12. The nonwoven of claim 1 additionally comprising a meltblown web intimately hydroentangled with said fibrous web and said net.

13. The nonwoven fabric of claim 1 wherein said elastomer is thermoplastic.

14. The nonwoven fabric of claim 1 wherein said elastomer is crosslinked.

15. The nonwoven fabric of claim 1 wherein said elastomeric net comprises an A-B-A block copolymer, wherein A represents a styrene block and B represents unsaturated or fully hydrogenated rubber block.

16. The nonwoven fabric according to claim 10 wherein said elastomeric net additionally comprises a blended thermoplastic polymer.

17. The nonwoven fabric of claim 1 wherein said binder fibers comprise polyethylene.

18. The nonwoven fabric of claim 1 wherein said binder fibers comprise a polyester or copolyester polymer.

19. The nonwoven fabric according to claim 1 wherein said binder fibers are bicomponent fibers.

20. The nonwoven fabric according to claim 1 wherein said binder fibers are present in said fibrous web in an amount of between 10 and about 40 wt. %.

21. The nonwoven fabric of claim 1 wherein at least a portion of said binder fibers are thermally bonded to said elastomeric net.

22. The nonwoven fabric of claim 1 wherein there is substantially no bonding between said binder fibers and said elastomeric net.

23. The nonwoven fabric of claim 1 wherein said elastomeric net comprises between about 2 and about 30 strands per inch in each direction.

24. The nonwoven fabric of claim 1 wherein said elastomeric net is substantially free from thermal disruption.

25. The nonwoven fabric of claim 1 wherein said binder fibers are thermally activated by calendering.

26. The nonwoven fabric of claim 1 wherein said binder fibers are thermally activated by through-air bonding.

27. A composite elastic nonwoven fabric comprising: an elastomeric net having a plurality of apertures; a first and a second fibrous web, each comprising at least about 10 wt. % binder fibers said binder fibers comprising at least one low melting material having a melting temperature between about 100° to about 135° C., each of said fibrous webs additionally comprising non-binder fibers and being intimately hydroentangled with said net from opposite sides of said net such that at least a portion of said binder fibers in each of said first and second webs extend through apertures in said net;

at least a portion of said binder fibers having been thermally activated thereby bonding said hydroentangled first and second webs into a coherent, substantially unitary structure encompassing said elastomeric net.

28. The nonwoven fabric of claim 27 wherein each of said first and second fibrous webs comprise binder fibers in an amount of from about 10 to about 50 wt. %.

29. The nonwoven fabric according to claim 28 wherein each of said and first and second fibrous webs comprise non-binder fibers selected from the group consisting of polyester, polyolefin, nylon, acrylic, modacrylic, rayon, cellulose acetate, wool, cotton, and wood pulp.

30. The nonwoven fabric of claim 29 wherein said elastomeric net is substantially rectangular, and elastic in only one of the longitudinal and transverse directions.

31. The nonwoven fabric of claim 29 wherein said elastomeric net is elastic in both of the longitudinal and transverse directions.

32. The nonwoven fabric of claim 29 wherein said elastomeric net is of a non-rectangular geometry, and is elastic in one direction and not elastic in another direction.

33. The nonwoven fabric of claim 29 wherein said elastomeric net is of a non-rectangular geometry, and is elastic in all directions.

34. The nonwoven fabric of claim 21 wherein said elastomeric net is maintained in a stretched condition during hydroentangling of said net and said first and second fibrous webs.

35. The nonwoven fabric of claim 29 wherein said hydroentangled elastic net is thermally treated in the stretched state.

36. The nonwoven fabric of claim 29 wherein said hydroentangled elastic net is thermally treated in the relaxed state.

37. The nonwoven fabric of claim 29 additionally comprising a web of continuous filaments bonded or unbonded intimately hydroentangled with said elastomeric net and said first and second fibrous web.

38. The nonwoven fabric of claim 29 additionally comprising a meltblown web intimately hydroentangled with said elastomeric net and said first and second fibrous webs.

39. The nonwoven fabric of claim 27 wherein said elastomer is thermoplastic.

40. The nonwoven fabric of claim 27 wherein said elastomer is crosslinked.

41. The nonwoven fabric of claim 27 wherein said elastomeric net comprises an elastomer having repeating units of the formula A-B-A wherein A represents a styrene block and B represents an unsaturated rubber block or a fully hydrogenated rubber block.

42. The nonwoven fabric of claim 41 wherein said elastomeric net additionally comprises a blended thermoplastic polymer.

43. The nonwoven fabric of claim 27 wherein said binder fibers comprise a polymer selected from the group consisting of polyethylenes, polyesters, or and copolyesters.

44. The nonwoven fabric of claim 27 wherein said binder fibers are bicomponent binder fibers.

45. The nonwoven fabric of claim 27 wherein said binder fibers are present in each of said first and second fibrous webs in an amount of between about and about 40 wt. %.

46. The nonwoven fabric of claim 27 wherein at least a portion of the binder fibers of each of said first and second fibrous webs are thermally bonded to said elastomeric net.

47. The nonwoven fabric of claim 27 wherein there is substantially no bonding between said binder fibers and said elastomeric net.

48. The nonwoven fabric of claim 27 wherein said elastomeric net comprises between about 5 and about 30 strands per inch in each direction.

49. The nonwoven fabric of claim 27 wherein said elastomeric net is substantially free from thermal disruption.

50. The nonwoven fabric of claim 27 wherein said binder fibers are thermally activated by calendering.

51. The nonwoven fabric of claim 27 wherein said binder fibers are thermally activated by through-air bonding.

* * * * *